United States Patent
Lee et al.

(10) Patent No.: US 11,012,867 B1
(45) Date of Patent: May 18, 2021

(54) METHOD OF CELL PLACEMENT AND RELATED COMPUTER PROGRAM PRODUCT

(71) Applicant: NATIONAL CHIAO TUNG UNIVERSITY, Hsinchu (TW)

(72) Inventors: Ta-Sung Lee, Hsinchu (TW); Yu-Shan Chiu, Pingtung County (TW)

(73) Assignee: NATIONAL CHIAO TUNG UNIVERSITY, Hsinchu (TW)

( * ) Notice: Subject to any disclaimer, the term of this patent is extended or adjusted under 35 U.S.C. 154(b) by 0 days.

(21) Appl. No.: 16/936,445

(22) Filed: Jul. 23, 2020

(30) Foreign Application Priority Data

Feb. 27, 2020 (TW) .................................. 109106587

(51) Int. Cl.
 *H04W 16/28* (2009.01)
 *H04W 16/18* (2009.01)

(52) U.S. Cl.
 CPC ........... *H04W 16/18* (2013.01); *H04W 16/28* (2013.01)

(58) Field of Classification Search
 CPC ..... H04W 16/18; H04W 16/28; H04W 36/08; H04W 36/14
 See application file for complete search history.

(56) References Cited

U.S. PATENT DOCUMENTS

| 9,020,474 | B2 | 4/2015 | Guo |
| 9,510,209 | B2 | 11/2016 | Randall et al. |
| 9,560,532 | B2 * | 1/2017 | Wirola .................. G01S 5/0252 |
| 10,003,992 | B2 * | 6/2018 | Agyapong ............ H04W 24/10 |
| 2015/0327082 | A1 * | 11/2015 | Kadel .................... H04W 24/02 455/449 |
| 2019/0342763 | A1 * | 11/2019 | Jung ...................... G06T 17/05 |

FOREIGN PATENT DOCUMENTS

| CN | 1992967 B | 5/2010 |
| EP | 1098545 B1 | 8/2007 |
| KR | 20160140991 A | 12/2016 |

(Continued)

OTHER PUBLICATIONS

Youyi Lu et al., "Performance Model and Deployment Strategy for Mm-wave Multi-Cellular Systems", 2016 25th Wireless and Optical Communication Conference (WOCC), 4 pages, 2016.

(Continued)

*Primary Examiner* — Michael T Vu
(74) *Attorney, Agent, or Firm* — CKC & Partners Co., LLC

(57) ABSTRACT

A method of cell placement includes choosing the ray-tracing channel matrices for the Nth iteration according to candidate cell locations of the Nth iteration and the user distributions, calculating fitness values for the Nth iteration based on the ray-tracing channel matrices, substituting the fitness values for the Nth iteration and corresponding candidate cell locations for the best fitness and best candidate cell locations in a total iterative process respectively if the fitness values for the Nth iteration are greater than or equal to multiple thresholds and the best fitness in a total iterative process, storing candidate cell locations of the Nth iteration, and verifies termination criteria, if termination criteria are not satisfied at the Nth iteration, generating the candidate cell locations of the N+1th iteration.

20 Claims, 8 Drawing Sheets

(56) References Cited

FOREIGN PATENT DOCUMENTS

WO  2014/101845 A1  7/2014

OTHER PUBLICATIONS

Gwo-Jong Yu et al., "A k-means Based Small Cell Deployment Algorithm for Wireless Access Networks", 2016 International Conference on Networking and Network Applications, pp. 393-398, 2016.
Xuan Du et al., "A Map-Assisted WiFi AP Placement Algorithm Enabling Mobile Device's Indoor Positioning", IEEE Systems Journal, vol. 11, No. 3, Sep. 2017, pp. 1467-1475.
Hakim Ghazzai et al., "Optimized LTE Cell Planning With Varying Spatial and Temporal User Densities", IEEE Transactions on Vehicular Technology, vol. 65, No. 3, Mar. 2016, pp. 1575-1589.
Liangliang Li et al., "Base Station Locations Optimization in LTE Using Artificial Immune Algorithm", 2017 10th International Symposium on Computational Intelligence and Design, 2017, pp. 165-168.

\* cited by examiner

400A

500B

| parameter | 400B | 400A |
|---|---|---|
| system capacity(bits/s) | $4.6112 \times 10^{11}$ | $4.2368 \times 10^{11}$ |
| coverage(%) | 91.8% | 85.9% |

| parameter | 500B | 500A |
|---|---|---|
| system capacity(bits/s) | $3.3368 \times 10^{11}$ | $2.085 \times 10^{11}$ |
| coverage(%) | 98.5% | 73.9% |

Fig. 6

METHOD OF CELL PLACEMENT AND RELATED COMPUTER PROGRAM PRODUCT

RELATED APPLICATION

The present application claims priority to Taiwan Application Serial Number 109106587, filed Feb. 27, 2020, which is incorporated herein by reference in its entirety.

BACKGROUND

Technical Field

The present disclosure relates to a method of cell placement and related computer program product. More particularly, the present disclosure relates to the method of cell placement for 5G mobile network.

Description of Related Art

When constructing a mobile network, locations for base station placement are usually limited by environmental constraint of a field of placement. To reflect actual electromagnetic environment of different fields of placement more accurately, traditionally, finding the best locations for cell (base station) placement relies on manually testing signal quality for each location, causing increasing cost for time and manpower.

SUMMARY

In order to solve the problem mentioned above, one aspect of the present disclosure is to provide a method of cell placement comprising: generating a user distributions according to a plurality of user locations in a field of placement; generating a plurality of ray-tracing channel matrices according to the user distributions and a plurality of locations that cells can be placed; generating candidate cell locations of a Nth iteration and velocities of variation of the candidate cell locations of the Nth iteration, and choosing the ray-tracing channel matrices for the Nth iteration according to candidate cell locations of the Nth iteration and the user distributions; calculating fitness values for the Nth iteration based on the ray-tracing channel matrices, wherein the fitness values comprises a coverage and a system capacity; storing the maximum coverage of the fitness values of the Nth iteration as a best fitness value and the corresponding candidate cell locations as best candidate cell locations for the Nth iteration, if the fitness values for the Nth iteration are greater than or equal to one of the multiple thresholds; storing the maximum system capacity of the fitness values of the Nth iteration as the best fitness value and the corresponding candidate cell locations as the best candidate cell locations for the Nth iteration, if the fitness values for the Nth iteration are greater than or equal to the multiple thresholds; substituting the best fitness value and the corresponding best candidate cell locations of the Nth iteration for the best fitness value and the best candidate cell locations generated in a total iterative process, respectively, if the best fitness values for the Nth iteration are greater than any best fitness values generated in the total iterative process; and generating the candidate cell locations of a N+1th iteration and the velocities of variation of the candidate cell locations of the N+1th iteration for the N+1th iteration operation, if termination criteria are not satisfied at the Nth iteration.

Some aspects of the present disclosure provide a computer program product stored in a memory of a cell placement system, allowing the cell placement system conducting an operation for finding locations of cell placement, the operation comprising: generating a user distributions according to a plurality of user locations in a field of placement; generating a plurality of ray-tracing channel matrices according to the user distributions and a plurality of locations that cells can be placed; generating candidate cell locations of a Nth iteration and velocities of variation of the candidate cell locations of the Nth iteration, and choosing the ray-tracing channel matrices for the Nth iteration according to candidate cell locations of the Nth iteration and the user distributions; calculating fitness values for the Nth iteration based on the ray-tracing channel matrices, wherein the fitness values comprises a coverage and a system capacity; storing the maximum coverage of the fitness values of the Nth iteration as a best fitness value and the corresponding candidate cell locations as best candidate cell locations for the Nth iteration, if the fitness values for the Nth iteration are greater than or equal to one of the multiple thresholds; storing the maximum system capacity of the fitness values of the Nth iteration as the best fitness value and the corresponding candidate cell locations as the best candidate cell locations for the Nth iteration, if the fitness values for the Nth iteration are greater than or equal to the multiple thresholds; substituting the best fitness value and the corresponding best candidate cell locations of the Nth iteration for the best fitness value and the best candidate cell locations generated in a total iterative process, respectively, if the best fitness values for the Nth iteration are greater than any best fitness values generated in the total iterative process; and generating the candidate cell locations of a N+1th iteration and the velocities of variation of the candidate cell locations of the N+1th iteration for the N+1th iteration operation, if termination criteria are not satisfied at the Nth iteration.

As described above, the method of cell placement and related computer program product in some embodiments of the present disclosure can enhance accuracy of simulation for the cell placement, and reduce the cost of measuring time.

BRIEF DESCRIPTION OF THE DRAWINGS

FIG. 6 is a diagram of performance comparison for the method of base station placement.

DETAILED DESCRIPTION

It is to be understood that both the foregoing general description and the following detailed description are by examples, and are intended to provide further explanation of the disclosure as claimed.

All the terms used in this document generally have their ordinary meanings. The examples of using any terms discussed herein such as those defined in commonly used dictionaries are illustrative only, and should not limit the scope and meaning of the disclosure. Likewise, the present disclosure is not limited to some embodiments given in this document.

Figure 1:
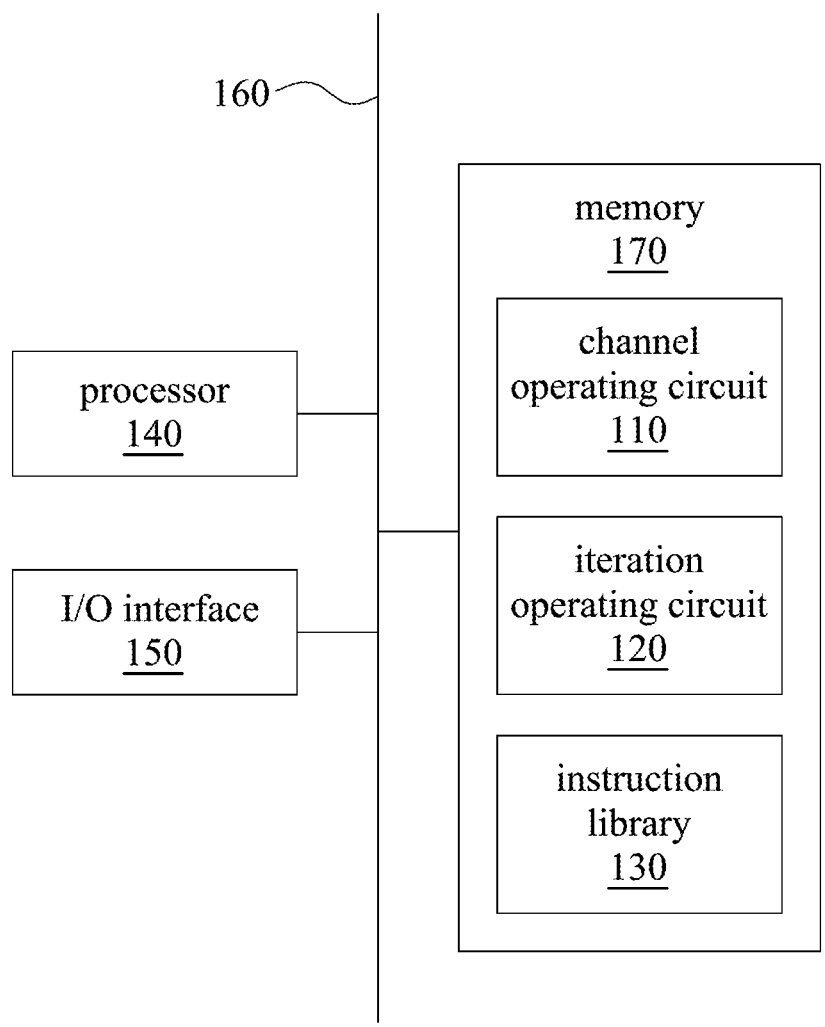
FIG. 1 is a schematic diagram of system of cell placement, in accordance with some embodiments of the present disclosure.

FIG. 1 is a schematic diagram of system 100 of cell placement, in accordance with some embodiments of the present disclosure. The system 100 of cell placement in the present disclosure is for finding best locations for cell placement in a field of placement. In some embodiments, cell placement includes placement of microcells, macrocells, and small cells. In some other embodiments, the placement of macrocells may be regarded as 4G signal base station placement, and the placement of small cells may be regarded as 5G signal base station placement.

The system 100 of cell placement comprises channel operating circuit 110, iteration operating circuit 120, instruction library 130, a processor 140, an I/O interface 150, a bus 160 and a memory 170. The processor 140, I/O interface 150 and the memory 170 can electrically couple to each other through the bus 160 in order to operate cooperatively. For example, the processor 140, through the bus 160, can read and execute the channel operating circuit 110, iteration operating circuit 120 and the instruction library 130 to conduct operation of finding cell placement locations. In some embodiments, instruction library 130 stores multiple instructions, such as instruction for operating channel data, instruction for operating iteration and instruction for checking threshold values.

Moreover, the I/O interface 150 may be used for inputting/outputting data or instructions, in order for one or more external input/output device (not shown, e.g., mouse, keyboard, and touchscreen) to transmit or receive instructions through the bus 160.

In some embodiments, the processor 140 may be realized by a central processor (CPU), a microprocessor (MCU) or other similar or suitable processors.

In some embodiments, the bus 160 may be one or more of any type of several bus architectures, including memory bus, memory controller, periphery bus, video bus or other suitable bus.

In some embodiments, the memory 170 may comprise any type of system memory, such as a static random access memory (SRAM), a dynamic random access memory (DRAM) or a read-only memory (ROM).

Figure 2:
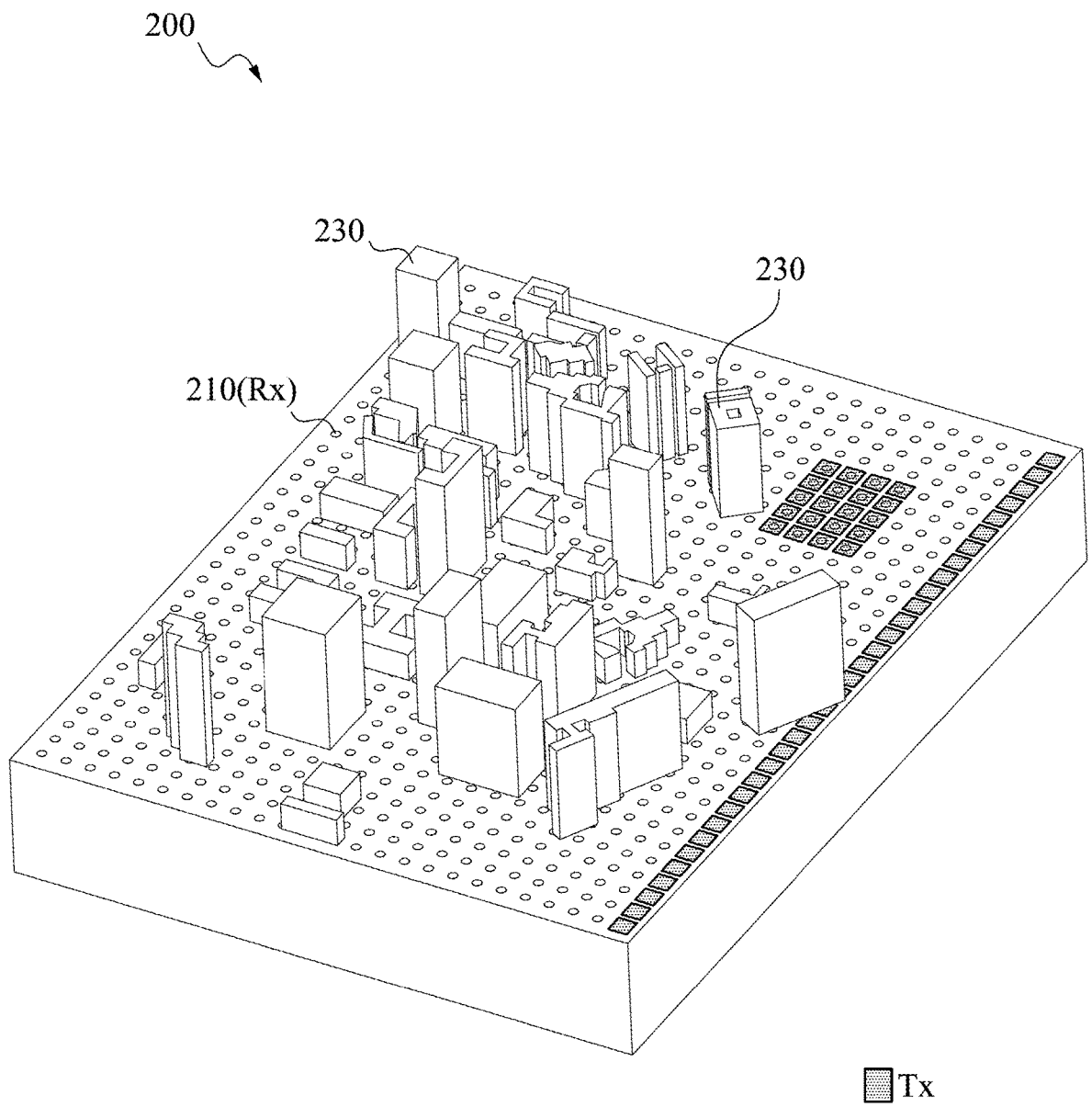
FIG. 2 is a schematic diagram of field of placement, in accordance with some embodiments of the present disclosure.

FIG. 2 is a schematic diagram of field 200 of placement, in accordance with some embodiments of the present disclosure. The channel operating circuit 110 stores multiple data corresponding to the field 200, and the data comprises user distributions, multiple locations that cells can be placed, and environment data (e.g., locations of buildings 230) of the field 200. As shown in FIG. 2, in some embodiments, the user distributions may be represented by user locations 210 in the field 200, such as locations of receivers RX, and the locations that cells can be placed may be represented by locations of transmitters TX. It is to be noted that, the locations of transmitters TX in the field 200 may be adjusted according to actual environmental limitations, for instance, the locations that cells can be placed may not overlap the locations of buildings 230 in the field 200 of placement.

In some embodiments, the channel operating circuit 110 generates a number of multi-input multi-output (MIMO) ray-tracing channel matrices according to the locations of transmitters TX and receivers RX in the field 200.

In some embodiments, each cell has $N_t$ transmitting antennas, and each user terminal has $N_r$ receiving antennas. Then, one of the ray-tracing channel matrices, represented by $H_{u,c}$, between the cth cell and the uth user terminal is defined as formula (1) below, in which $\tau$, p, $\Phi$ represents delay, received power and phase respectively, and $h_{nm}$ is a channel coefficient between the nth receiving antenna and the mth transmitting antenna.

$$H_{u,c}(\tau, p, \Phi) = \begin{bmatrix} h_{11}(\tau, p, \Phi) & \cdots & h_{1N_t}(\tau, p, \Phi) \\ \vdots & \ddots & \vdots \\ h_{N_r1}(\tau, p, \Phi) & \cdots & h_{N_rN_t}(\tau, p, \Phi) \end{bmatrix} \quad (1)$$

In some embodiments, channel operating circuit 110 may be realized by electromagnetic simulation software having ray-tracing function.

In some embodiments, iteration operating circuit 120 may be implemented by computer software such as C++ and MatLab.

Figure 3:
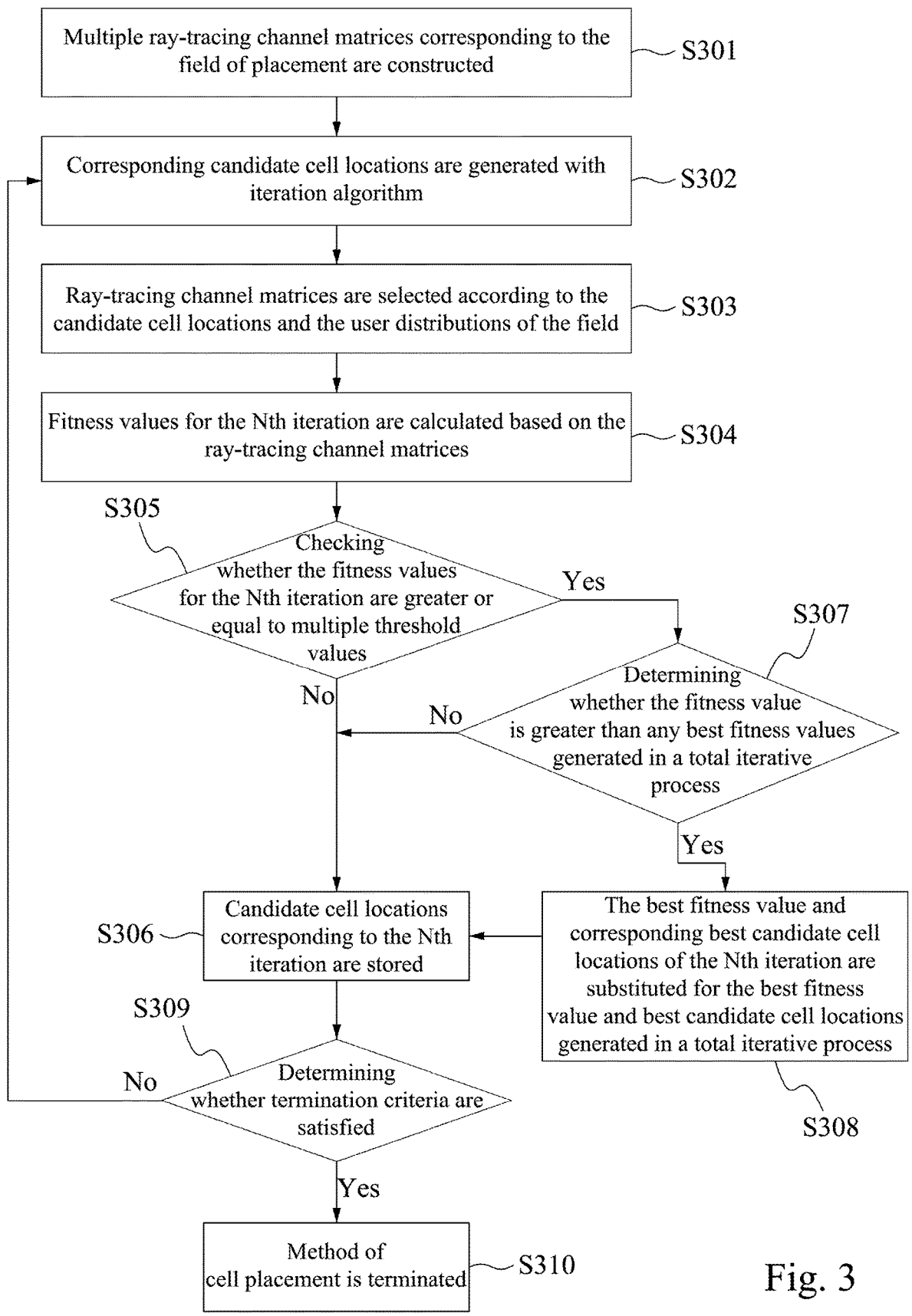
FIG. 3 is a flowchart of method of cell placement, in accordance with some embodiments of the present disclosure.

FIG. 3 is a flowchart of method 300 of cell placement, in accordance with some embodiments of the present disclosure. As shown in FIG. 3, method 300 of cell placement comprises operation S301, operation S302, operation S303, operation S304, operation S305, operation S306, operation S307, operation S308, operation S309, and operation S310. For the ease and clarity of illustration, specific operations of the method 300 are described in the following paragraphs by referring to the embodiments shown in FIG. 1 and FIG. 2, but are not limited as such.

In operation S301, the channel operating circuit 110 constructs multiple ray-tracing channel matrices, corresponding to the field 200, according to the locations of transmitters TX and receivers RX in the field 200 of placement. In operation S302, iteration operating circuit 120 generates corresponding candidate cell locations with iteration algorithm. Then, in operation S303, ray-tracing channel matrices are selected according to the candidate cell locations and the user distributions of the field 200.

In some embodiments, the operation S301 includes generating the user distributions according to the user locations in the field 200 of placement. For instance, the user locations may change with time, e.g., the field 200 may have different distributions for the user locations in the morning and at night, result in different user distributions. In some embodiments, the user distributions mentioned above may be represented by distributions of receivers RX.

In some embodiments, in the operation S301, the field 200 may be divided into a plurality of subareas first, then corresponding subuser distributions is generated according to the user locations in the subareas. For instance, the field 200 is divided into a number of subareas, and a population density of each subarea may be an uniform distribution, a Gaussian distribution or other distributions alike, thereby different user distributions are generated according to the population density of the subareas. In some embodiments, distribution of users for the field 200 can be reflected more accurately by the subuser distributions.

In some embodiments, the operation S301 further comprises generating multiple ray-tracing channel matrices $H_{u,c}$, by the channel operating circuit 110, according to the user distributions and the locations that cells can be placed.

In some embodiments, in the operation S302 and operation S303, the iteration operating circuit 120 generates candidate cell locations and velocities of variation of the candidate cell locations. The velocities of variation of the candidate cell locations represents position variance between each iteration in a certain time period. For instance, the iteration operating circuit 120, using particle swarm optimization, generates locations and velocities of particle swarms (i.e., the candidate cell locations and the velocities of variation of the candidate cell locations) corresponding to an Nth iteration. By the processor 140, the instruction for operating channel data is executed, the ray-tracing channel matrices of the Nth iteration are chosen based on the candidate cell locations, and update speeds for a N+1th iteration are determined by the velocities of particle swarms corresponding to the Nth iteration.

In some embodiments, the operation S302 further comprises optimizing the iteration process, based on k-means clustering algorithm, dividing users into multiple groups according to the user distributions and defining each center of the group as initial positions for the candidate cell locations.

In operation S304, the processor 140 calculates fitness values for the Nth iteration based on the ray-tracing channel matrices. In some embodiments, calculating fitness values for the Nth iteration includes calculating a coverage and a system capacity for the Nth iteration. In an embodiment of the present disclosure, the coverage is defined as formula (2) below. In formula (2), there is U kinds of user distributions, a user coordinate $u_{i,j}$ of a jth user in an ith user distribution, user number $N_{user,i}$ in the ith user distributions, and the candidate cell locations x. If signal power of the cell received by the user exceeds certain threshold value, then $\gamma(x,u_{i,j})$ equals to 1, the user can be served by the cell. In contrast, if signal power of the cell is smaller than certain threshold value, then $\gamma(x,u_{i,j})$ equals to 0, the user cannot be served by the cell.

$$\frac{1}{U}\sum_{i=1}^{U}\frac{\sum_{j=1}^{N_{user,i}}\gamma(x, u_{i,j})}{N_{user,i}} \quad (2)$$

In some embodiments, the coverage and the system capacity would be affected by a beamforming effect in base stations. For instance, in order to improve signal attenuation of the 5G mobile network, the signal is transmitted directionally through antenna arrays, and the beamforming technology is used to achieve interference of wavelength superposition in a specific direction to have a longer distance signal transmission. Therefore, in some embodiments, calculating the coverage and the system capacity further comprises choosing a beamforming weight vector from a set of beamforming weight vectors, and calculating signal to interference plus noise ratio (SINR) with the chosen beamforming weight vector.

In operation S305, the processor 140 executes the instruction for checking threshold values from the instruction library 130 in order to verify whether the fitness values for the Nth iteration are greater than or equal to multiple threshold values. In some embodiments, the threshold values include a predefined minimum value of the coverage and a predefined minimum value of the system capacity. If all of the fitness values of the candidate cell locations are not greater than or equal to the threshold values, in operation S306, only the candidate cell locations corresponding to the Nth iteration are stored. If any one of the fitness values of the candidate cell locations for the Nth iteration is greater than or equal to the threshold values, in operation S307, further determining whether the fitness value that is greater than or equal to the threshold values is also greater than any best fitness values generated in a total iterative process (i.e., $1^{st}$~N-1th iteration). If the result for the operation S307 is yes, operation S308 is proceeded. In the operation S308, substituting the best fitness value and corresponding best candidate cell locations of the Nth iteration for the best fitness value and best candidate cell locations generated in a total iterative process. If the result for the operation S307 is no, the operation S306 is proceeded, and the candidate cell locations for the Nth iteration are stored in order to generate the candidate cell locations for the N+1th iteration.

In the embodiment mentioned above, the situation of any one of the fitness values of the candidate cell locations for the Nth iteration is greater than or equal to the threshold values can be further illustrated by two examples below: in one embodiment, in operation S305, if there are M groups of candidate cell locations for the Nth iteration having the coverage greater than the predefined minimum value of the coverage, and there are P groups, among the M groups of candidate cell locations mentioned above, having the system capacity also greater than the predefined minimum value of the system capacity, then a maximum system capacity is chosen from the P groups of candidate cell locations, and the maximum system capacity is also chosen as the best fitness value for the Nth iteration. Next, the operation S307 is proceeded by determining whether the best fitness value for the Nth iteration is greater than any best system capacity generated in a total iterative process (i.e., $1^{st}$~N-1th iteration). If yes, the operation S308 is proceeded. In the operation S308, the processor 140 stores the best fitness value for the Nth iteration and corresponding candidate cell locations in the memory 170 as currently best locations $x_{cap}$ for cell placement. If not, then the operation S306 is proceeded. In the operation S306, the processor 140 stores the candidate cell locations and the velocities of variation of the candidate cell locations for the Nth iteration in the memory 170. In the other embodiment, in operation S305, if there are M groups of candidate cell locations for the Nth iteration having the coverage greater than the predefined minimum value of the coverage, but none of the M groups of candidate cell locations having the system capacity greater than the predefined minimum value of the system capacity, the maximum coverage of the M groups of candidate cell locations is chosen as the best fitness value for the Nth iteration in order for the operation S307 to be proceeded. In operation S307, determining whether the best fitness value for the Nth iteration is greater than any best coverage generated in a total iterative process (i.e., $1^{st}$~N-1th iteration). If yes, the operation S308 is proceeded. In the operation S308, the processor 140 stores the best fitness value for the Nth iteration and corresponding candidate cell locations in the memory 170 as locations $x_{cov}$ currently having the best coverage for cell placement. If not, then the operation S306 is proceeded. In the operation S306, the processor 140 stores the candidate cell locations and the velocities of variation of the candidate cell locations for the Nth iteration in the memory 170.

In some other embodiments, if any one of the candidate cell locations generated by the Nth iteration has the coverage smaller than the predefined minimum value of the coverage, the system capacity of the candidate cell locations for the Nth iteration is set to zero.

In some embodiments, for consideration of actual operation of the mobile communication system, it is import to ensure that every user can be served by at least one of the base stations first, and the system capacity can then be considered to be further improved. Therefore, the candidate cell locations, having the coverage greater than or equal to the predefined minimum value of the coverage in the iterative process, are chosen first, from which the candidate cell locations having the maximum system capacity can then be chosen.

In operation S309, determining whether termination criteria are satisfied. If the termination criteria are satisfied, the method 300 of cell placement is terminated, in operation S310, and the best locations $x_{cap}$ having the coverage greater than or equal to the predefined minimum value of the coverage and having the maximum system capacity are output and stored as final optimized locations $x_{opt}$ for cell placement in the memory 170.

If the termination criteria are not satisfied, return to the operation S302, the iteration operating circuit 120 generates new candidate cell locations and the velocities of variation of the new candidate cell locations for the N+1th iteration according to the candidate cell locations and the velocities of variation of the candidate cell locations of the Nth iteration stored in the operation S306. In some embodiments, the termination criteria include the number N of the iteration exceeding or equal to a maximum iteration number. In some other embodiments, the termination criteria further comprise the velocities of variation of the candidate cell locations for the N+1th iteration less than a predefined minimum value.

In the embodiment mentioned above, the maximum iteration number may be determined by the velocities of variation of the cell locations and the field 200 of placement. In general, the velocities of variation of the cell locations can be used for evaluating a range of assembles of the candidate cell locations, and the range that is greater than or equal to the field 200 of placement corresponds to the maximum iteration number.

In the embodiment mentioned above, the new candidate cell locations and the velocities of variation of the new candidate cell locations may depend on which iterative algorithm is used. For instance, the candidate cell locations and the velocities of variation of the candidate cell locations (i.e., particle positions) for the N+1th iteration are generated using the particle swarm optimization, according to the particle positions for the Nth iteration plus the particle speeds of the N+1th iteration. The particle speeds of the N+1th iteration are determined by a formula of particle updating speed for the particle swarm optimization.

Figure 4A:
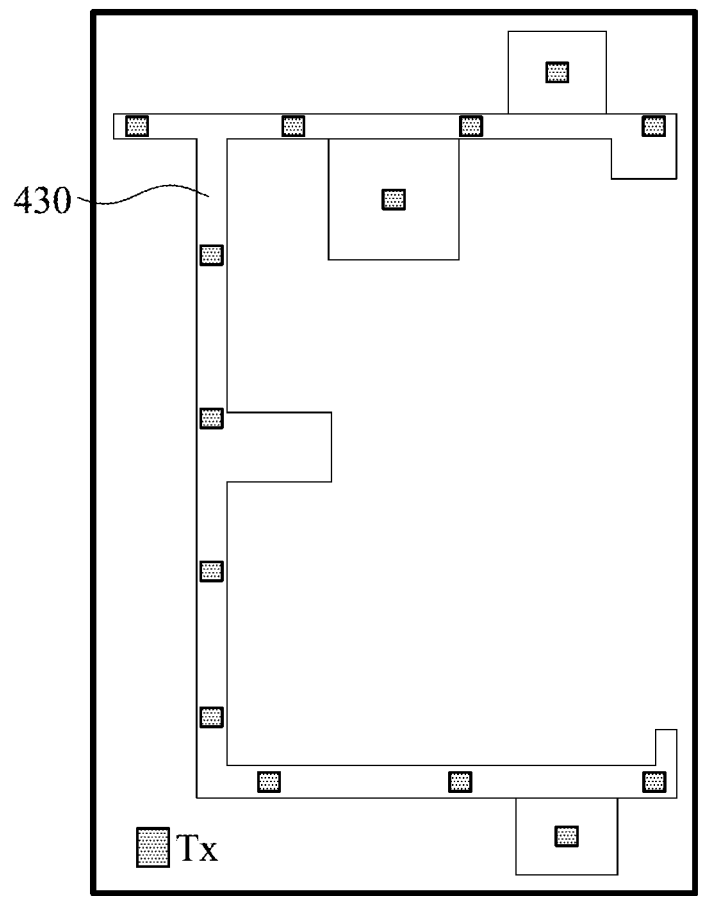
FIG. 4A is a top view diagram of method of uniform base station placement.
Figure 4B:
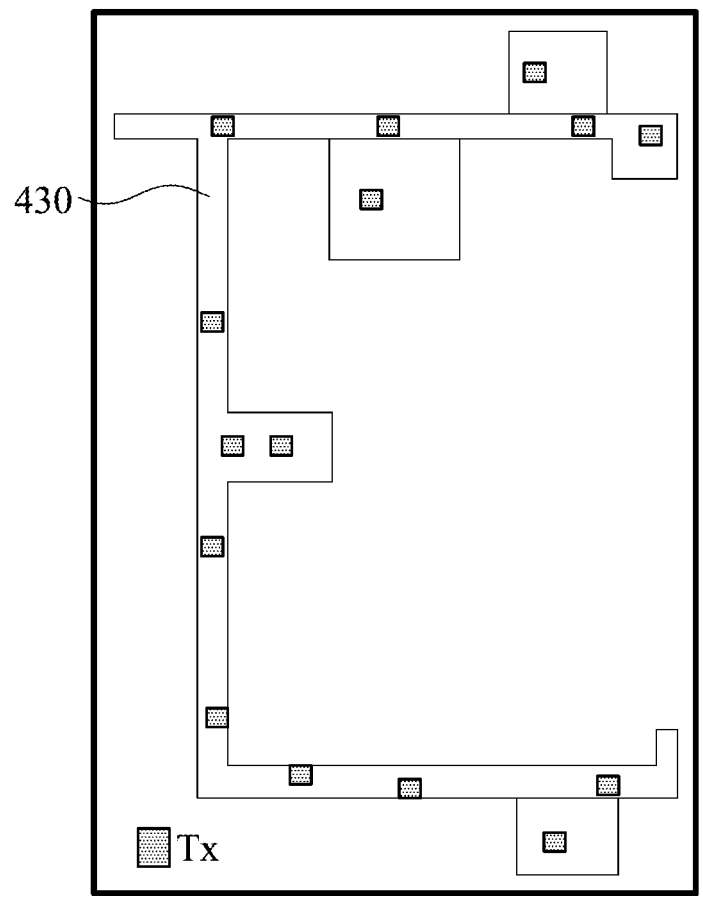
FIG. 4B is a top view diagram of method of base station placement, in accordance with an embodiment of the present disclosure.

FIG. 4A is a top view diagram of method 400A of uniform base station placement, FIG. 4B is a top view diagram of method 400B of base station placement, in accordance with an embodiment of the present disclosure. The locations that cells can be placed are represented by the locations of transmitters TX. The locations of transmitters TX may overlap with buildings 430 in order to simulate indoor transmission of communication.

Figure 5A:
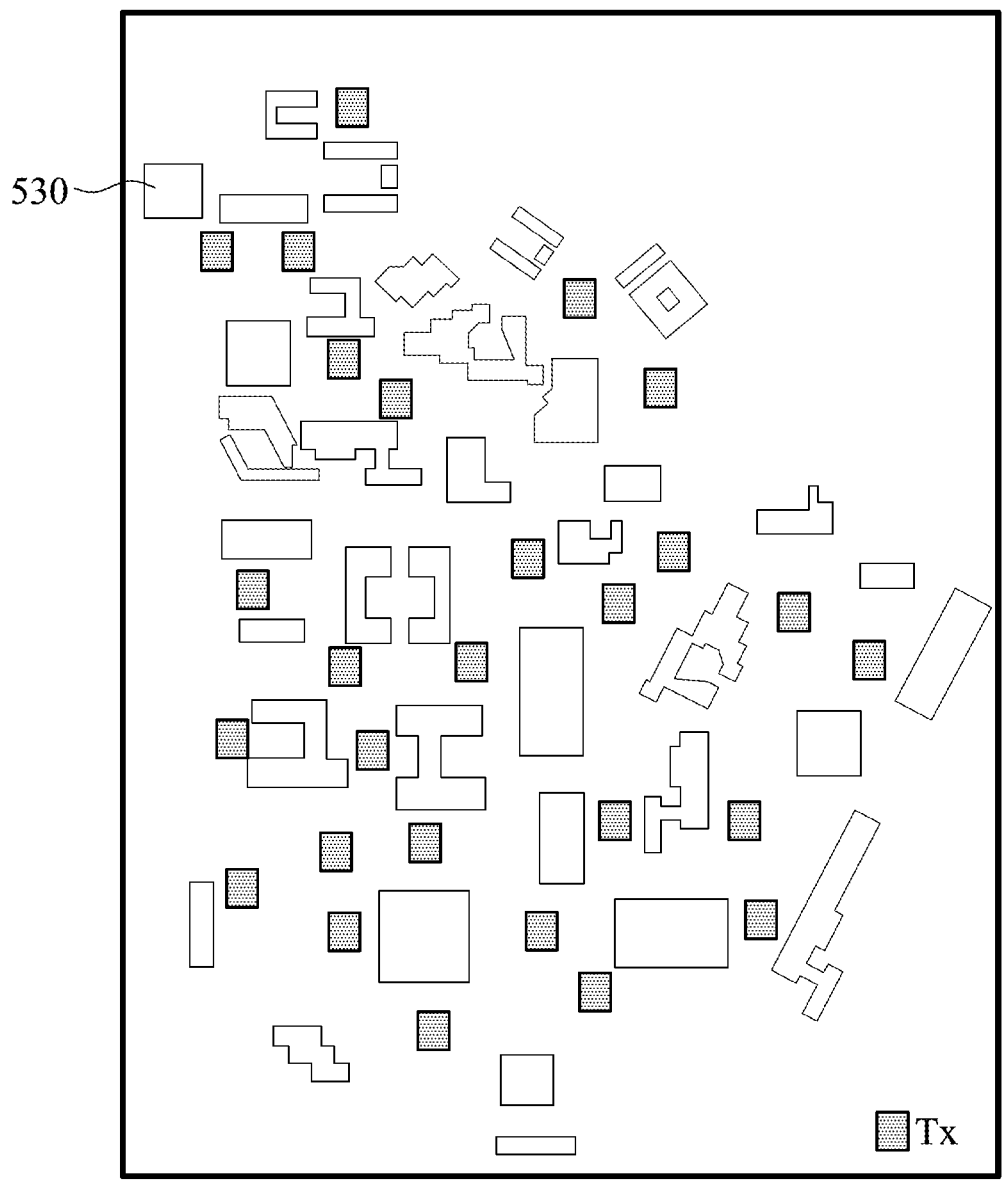
FIG. 5A is a top view diagram of method of random base station placement.
Figure 5B:
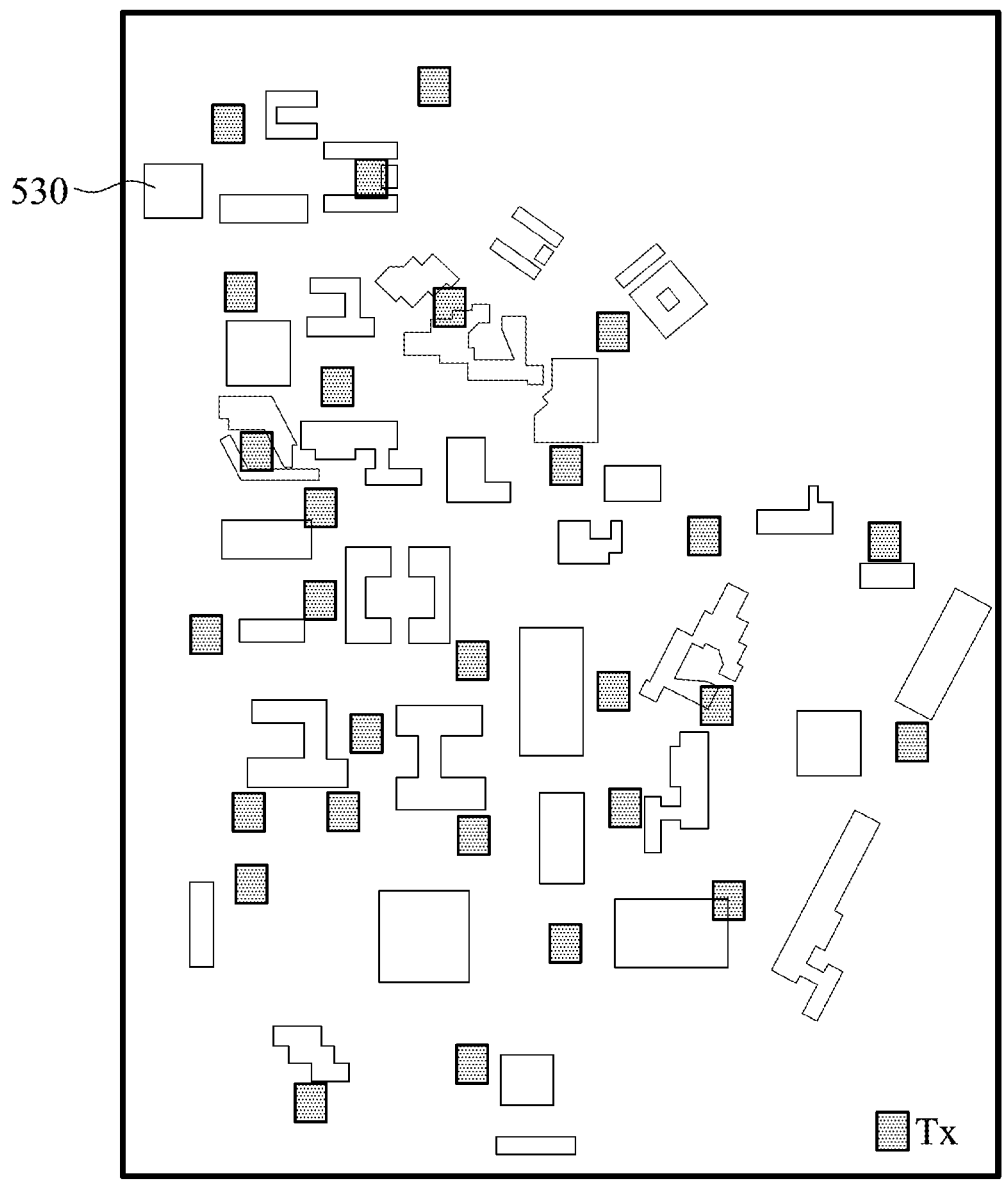
FIG. 5B is a top view diagram of method of base station placement, in accordance with an embodiment of the present disclosure.

FIG. 5A is a top view diagram of method of random base station placement. FIG. 5B is a top view diagram of method of base station placement, in accordance with an embodiment of the present disclosure. The locations that cells can be placed are represented by the locations of transmitters TX. The locations of transmitters TX may not overlap with buildings 530 in order to simulate outdoor transmission of communication.

FIG. 6 is a diagram of performance comparison for the method of base station placement. As shown in FIG. 6, the method 400B and the method 500B in the embodiment of the present disclosure are better than traditional method 400A and method 500A.

While the disclosure has been described by way of example(s) and in terms of the preferred embodiment(s), it is to be understood that the disclosure is not limited thereto. Those skilled in the art may make various changes, substitutions, and alterations herein without departing from the spirit and scope of the present disclosure. In view of the foregoing, it is intended that the present invention cover modifications and variations of this invention provided they fall within the scope of the following claims.

What is claimed is:

1. A method of cell placement comprising:
generating a user distributions according to a plurality of user locations in a field of placement;
generating a plurality of ray-tracing channel matrices according to the user distributions and a plurality of locations that cells can be placed;
generating candidate cell locations of a Nth iteration and velocities of variation of the candidate cell locations of the Nth iteration, and choosing the ray-tracing channel matrices for the Nth iteration according to candidate cell locations of the Nth iteration and the user distributions;
calculating fitness values for the Nth iteration based on the ray-tracing channel matrices, wherein the fitness values comprises a coverage and a system capacity;
storing the maximum coverage of the fitness values of the Nth iteration as a best fitness value and the corresponding candidate cell locations as best candidate cell locations for the Nth iteration, if the fitness values for the Nth iteration are greater than or equal to one of the multiple thresholds;
storing the maximum system capacity of the fitness values of the Nth iteration as the best fitness value and the corresponding candidate cell locations as the best candidate cell locations for the Nth iteration, if the fitness values for the Nth iteration are greater than or equal to the multiple thresholds;
substituting the best fitness value and the corresponding best candidate cell locations of the Nth iteration for the best fitness value and the best candidate cell locations generated in a total iterative process, respectively, if the best fitness values for the Nth iteration are greater than any best fitness values generated in the total iterative process; and
generating the candidate cell locations of a N+1th iteration and the velocities of variation of the candidate cell locations of the N+1th iteration for the N+1th iteration operation, if termination criteria are not satisfied at the Nth iteration.

2. The method of cell placement of claim 1, further comprising:
generating candidate cell locations of the N+1th iteration and the velocities of variation of the candidate cell locations of the N+1th iteration, and choosing the ray-tracing channel matrices for the N+1th iteration according to the candidate cell locations of the N+1th iteration and the user distributions;
calculating the fitness values for the N+1th iteration based on the ray-tracing channel matrices;

substituting the best fitness value and the corresponding best candidate cell locations of the N+1th iteration for the best fitness value and best candidate cell locations generated in the total iterative process, respectively, if the best fitness values for the N+1th iteration are greater than any best fitness values generated in the total iterative process; and a N+2th iteration is not proceeded if termination criteria are satisfied at the N+1th iteration.

3. The method of cell placement of claim 1, wherein generating the user distributions according to the user locations in the field of placement comprises:

dividing the field of placement into a plurality of subareas and generating corresponding user distributions according to a population density of the subareas, such that the user distributions for the field of placement can be reflected more accurately by the corresponding user distributions of the subareas.

4. The method of cell placement of claim 1, further comprising:

choosing multiple ray-tracing channel matrices corresponding to the Nth iteration from the generated ray-tracing channel matrices according to candidate cell locations of the Nth iteration and the user distributions, so as to reduce complexity of the iteration.

5. The method of cell placement of claim 1, further comprising:

dividing users into a plurality of groups according to the user locations with k-means clustering algorithm; and setting a plurality of center locations of the groups as the candidate cell locations before iteration.

6. The method of cell placement of claim 1, further comprising:

verifying the fitness values for the Nth iteration are greater than or equal to the multiple thresholds with a specific priority, wherein the specific priority comprises verifying the coverage of the Nth iteration is greater than or equal to the thresholds first.

7. The method of cell placement of claim 1, wherein the thresholds comprises:

a predefined minimum value of the coverage; and a predefined minimum value of the system capacity.

8. The method of cell placement of claim 7, further comprising:

setting the system capacity of the Nth iteration to zero if the coverage of the Nth iteration is less than the predefined minimum value of the coverage.

9. The method of cell placement of claim 1, wherein the termination criteria comprises:

N is greater than or equal to a maximum number of iteration, wherein the maximum number of iteration can be determined by evaluating number of iteration needed for a set of the candidate cell locations of the N+1th iteration to be greater than or equal to the field of placement, according to the velocities of variation of the candidate cell locations of the Nth iteration.

10. The method of cell placement of claim 1, wherein calculating fitness values for the Nth iteration comprising:

calculating a coverage and a system capacity of the Nth iteration according to a plurality of weight vectors for beamforming.

11. A computer program product stored in a memory of a cell placement system, allowing the cell placement system conducting an operation for finding locations of cell placement, the operation comprising:

generating a user distributions according to a plurality of user locations in a field of placement;

generating a plurality of ray-tracing channel matrices according to the user distributions and a plurality of locations that cells can be placed;

generating candidate cell locations of a Nth iteration and velocities of variation of the candidate cell locations of the Nth iteration, and choosing the ray-tracing channel matrices for the Nth iteration according to candidate cell locations of the Nth iteration and the user distributions;

calculating fitness values for the Nth iteration based on the ray-tracing channel matrices, wherein the fitness values comprises a coverage and a system capacity;

storing the maximum coverage of the fitness values of the Nth iteration as a best fitness value and the corresponding candidate cell locations as best candidate cell locations for the Nth iteration, if the fitness values for the Nth iteration are greater than or equal to one of the multiple thresholds;

storing the maximum system capacity of the fitness values of the Nth iteration as the best fitness value and the corresponding candidate cell locations as the best candidate cell locations for the Nth iteration, if the fitness values for the Nth iteration are greater than or equal to the multiple thresholds;

substituting the best fitness value and the corresponding best candidate cell locations of the Nth iteration for the best fitness value and the best candidate cell locations generated in a total iterative process, respectively, if the best fitness values for the Nth iteration are greater than any best fitness values generated in the total iterative process; and generating the candidate cell locations of a N+1th iteration and the velocities of variation of the candidate cell locations of the N+1th iteration for the N+1th iteration operation, if termination criteria are not satisfied at the Nth iteration.

12. The computer program product of claim 11, wherein the operation further comprising:

generating candidate cell locations of the N+1th iteration and the velocities of variation of the candidate cell locations of the N+1th iteration, and choosing the ray-tracing channel matrices for the N+1th iteration according to the candidate cell locations of the N+1th iteration and the user distributions;

calculating the fitness values for the N+1th iteration based on the ray-tracing channel matrices;

substituting the best fitness value and the corresponding best candidate cell locations of the N+1th iteration for the best fitness value and the best candidate cell locations generated in the total iterative process, respectively, if the best fitness values for the N+1th iteration are greater than any best fitness values generated in the total iterative process; and a N+2th iteration is not proceeded if termination criteria are satisfied at the N+1th iteration.

13. The computer program product of claim 11, wherein generating the user distributions according to the user locations in the field of placement comprises:

dividing the field of placement into a plurality of subareas and generating corresponding user distributions according to a population density of the subareas, such that the user distributions for the field of placement can be reflected more accurately by the corresponding user distributions of the subareas.

14. The computer program product of claim 11, further comprising:

choosing multiple ray-tracing channel matrices corresponding to the Nth iteration from the generated ray-tracing channel matrices according to candidate cell locations of the Nth iteration and the user distributions, so as to reduce complexity of the iteration.

15. The computer program product of claim 14, further comprising:
dividing users into a plurality of groups according to the user locations with k-means clustering algorithm; and
setting a plurality of center locations of the groups as the candidate cell locations before iteration.

16. The computer program product of claim 11, further comprising:
verifying the fitness values for the Nth iteration are greater than or equal to the multiple thresholds with a specific priority, wherein the specific priority comprises verifying the coverage of the Nth iteration is greater than or equal to the thresholds first.

17. The computer program product of claim 11, wherein the thresholds comprises:
a predefined minimum value of the coverage; and
a predefined minimum value of the system capacity.

18. The computer program product of claim 17, further comprising:
setting the system capacity of the Nth iteration to zero if the coverage of the Nth iteration is less than the predefined minimum value of the coverage.

19. The computer program product of claim 17, wherein calculating fitness values for the Nth iteration comprising:
calculating a coverage and a system capacity of the Nth iteration according to a plurality of weight vectors for beamforming.

20. The computer program product of claim 11, wherein the termination criteria comprises:
N is greater than or equal to a maximum number of iteration, wherein the maximum number of iteration can be determined by evaluating number of iteration needed for a set of the candidate cell locations of the N+1th iteration to be greater than or equal to the field of placement, according to the velocities of variation of the candidate cell locations of the Nth iteration.

* * * * *